United States Patent
Mironets et al.

(10) Patent No.: US 12,083,601 B2
(45) Date of Patent: Sep. 10, 2024

(54) METHOD FOR FORMING VIABLE HIGH ENTROPY ALLOYS VIA ADDITIVE MANUFACTURING

(71) Applicant: Hamilton Sundstrand Corporation, Charlotte, NC (US)

(72) Inventors: Sergey Mironets, Burlington (CA); Thomas J. Martin, East Hampton, CT (US); Alexander Staroselsky, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/722,775

(22) Filed: Apr. 18, 2022

(65) Prior Publication Data

US 2022/0241854 A1 Aug. 4, 2022

Related U.S. Application Data

(63) Continuation-in-part of application No. 16/280,990, filed on Feb. 20, 2019, now abandoned.

(51) Int. Cl.
*B22F 3/23* (2006.01)
*B22F 1/145* (2022.01)
(Continued)

(52) U.S. Cl.
CPC .............. *B22F 3/23* (2013.01); *B22F 1/145* (2022.01); *B22F 3/15* (2013.01); *B22F 9/04* (2013.01);
(Continued)

(58) Field of Classification Search
CPC .......... B22F 1/142; B22F 1/145; B22F 10/10; B22F 10/20; B22F 3/15; B22F 3/23;
(Continued)

(56) References Cited

U.S. PATENT DOCUMENTS

| | | |
|---|---|---|
| 2004/0057861 A1 | 3/2004 | Zhu et al. |
| 2017/0209954 A1 | 7/2017 | Kato et al. |

(Continued)

FOREIGN PATENT DOCUMENTS

| | | |
|---|---|---|
| CN | 104308153 A | 1/2015 |
| CN | 104368814 A | 2/2015 |

(Continued)

OTHER PUBLICATIONS

Zheng, F. et al. "A new method of preparing high-performance high-entropy alloys through high-gravity combustion synthesis" International Journal of Minerals, Metallurgy and Materials, vol. 27, No. 10 (Year: 2020).*

(Continued)

*Primary Examiner* — Anthony M Liang
*Assistant Examiner* — Danny N Kang
(74) *Attorney, Agent, or Firm* — Kinney & Lange, P.A.

(57) ABSTRACT

A method for making a component comprising a high entropy alloy (HEA) includes combining a reaction component with a powdered HEA precursor, igniting the combination of the reaction component and the powdered HEA precursor to induce a self-propagating high-temperature synthesis (SHS) reaction and to form a solid HEA feedstock, converting the solid HEA feedstock into a powder HEA feedstock, and additively manufacturing at least a portion of the powder feedstock into a HEA component or HEA preformed shape approximating a desired shape of the component.

5 Claims, 2 Drawing Sheets

(51) Int. Cl.
  *B22F 3/15* (2006.01)
  *B22F 9/04* (2006.01)
  *B33Y 10/00* (2015.01)
  *B33Y 40/10* (2020.01)
  *B33Y 40/20* (2020.01)
(52) U.S. Cl.
  CPC ............... *B33Y 10/00* (2014.12); *B33Y 40/10* (2020.01); *B33Y 40/20* (2020.01)
(58) Field of Classification Search
  CPC ... B22F 3/24; B22F 9/04; B22F 9/082; B33Y 10/00; B33Y 40/10; B33Y 40/20; B33Y 70/00; C22C 1/0458
  See application file for complete search history.

(56) References Cited

U.S. PATENT DOCUMENTS

| | | | |
|---|---|---|---|
| 2017/0209963 A1 | 7/2017 | Smathers et al. | |
| 2017/0369970 A1 | 12/2017 | Yeh et al. | |
| 2018/0363104 A1 | 12/2018 | Fujieda et al. | |
| 2020/0114427 A1* | 4/2020 | Karuppoor | B29C 64/209 |
| 2020/0261980 A1 | 8/2020 | Mironets et al. | |

FOREIGN PATENT DOCUMENTS

| | | | | |
|---|---|---|---|---|
| CN | 105886812 A | | 8/2016 | |
| CN | 105886812 B | | 3/2018 | |
| CN | 107747019 A | | 3/2018 | |
| CN | 108149118 A | | 6/2018 | |
| CN | 108504889 A | | 9/2018 | |
| CN | 108555295 A | | 9/2018 | |
| CN | 109317671 A | * | 2/2019 | |
| CN | 113061763 A | * | 7/2021 | ............. B33Y 10/00 |
| EP | 3392359 A1 | | 10/2018 | |

OTHER PUBLICATIONS

Extended European Search Report for EP Application No. 23167734.5, dated Sep. 1, 2023, 10 pages.
Communication Pursuant to Article 94(3) EPC for EP Application No. 19210143.4, dated Oct. 6, 2021, 5 pages.
Extended European Search Report for EP Application No. 19210143.4, dated Mar. 26, 2020, 12 pages.
N. Kashaev, et al., "Laser beam welding of a CoCrFeNiMn-type high entropy alloy produced by self-propagating high-temperature synthesis", from Intermetallics 96 (2018) pp. 63-71.
O. N. Senkov, et al., "Compositional variation effects on the microstructure and properties of a refreactory high-entropy superalloy AlMo0.5NbTa0.5TiZr", from Materials and Design 139 (2018) pp. 498-511.
V. N. Sanin, et al., "SHS Metallurgy of High-Entropy Transition Metal Alloys", from Doklady Physical Chemistry, vol. 470, Part 2 (2016) pp. 421-426.

* cited by examiner

METHOD FOR FORMING VIABLE HIGH ENTROPY ALLOYS VIA ADDITIVE MANUFACTURING

CROSS-REFERENCE TO RELATED APPLICATION(S)

This application is a continuation-in-part of U.S. application Ser. No. 16/280,990 filed Feb. 20, 2019 for "Method for Identifying and Forming Viable High Entropy Alloys Via Additive Manufacturing" by S. Mironets, T. Martin, and A. Staroselsky.

BACKGROUND

The disclosure relates generally to high entropy alloys (HEA) and more specifically to processes for identifying viable high entropy alloys and forming them into useful components by way of additive manufacturing.

Many advanced high temperature alloys, due to thermodynamic or other limitations, often consist of one or two primary components (e.g., nickel-based superalloys, titanium aluminide, etc.) with small amounts (e.g., no more than about 15% and often less) of multiple alloying elements to tailor particular mechanical, thermal, and/or microstructural properties). In contrast, high entropy alloys have a larger number (e.g., 4 or more) of constituents in roughly equal percentages. For most combinations, this causes microstructural instability for reasons that should be apparent to a skilled artisan familiar with materials science or other related fields.

At the same time, certain narrow combinations of elements have been identified which would fall within the range of an HEA, but exhibit a higher level of stability as well as excellent properties exceeding those seen in conventional superalloys. Yet those alloys have to date been infeasible to produce into useful components due to the inability to post-process without locally disturbing the narrowly stable microstructure.

Previous methods known to produce partially stable HEA structures have taken two forms. The first involves providing a preform, adding the molten alloy which is then solidified and subjected to hot isostatic processing (HIP). Despite this, the microstructure is inconsistent and porosity remains an impediment to a useful, stable part. Another known approach with its own shortcomings involves a preform then forging the finished part. Like the first, the issues of severe porosity and inconsistent microstructure remain. Both of these manufacturing processes are not yet able to produce complex shaped parts.

Roughly 70% of High Entropy Alloys (HEA) microstructure studies characterize as-cast alloys. The vast majority of the HEAs development approaches are based on ad-hoc alloy design rules, which require corroboration by experiments. The experiments are limited by solubility of alloying elements for producing homogenous materials without macro segregation. There is a need for developing an economical process for development of new generation of HEA.

SUMMARY

An example embodiment of a method is disclosed for making a component including a high entropy alloy (HEA). The method includes combining a reaction component with a powdered HEA precursor, igniting the combination of the reaction component and the powdered HEA precursor to induce a self-propagating high-temperature synthesis (SHS) reaction and to form a solid HEA feedstock, converting the solid HEA feedstock into a powder HEA feedstock, and additively manufacturing at least a portion of the powder feedstock into a HEA component or HEA preformed shape approximating a desired shape of the component.

An example embodiment of a method is disclosed for making a component including an HEA. The method includes mixing a reaction component with a powdered HEA precursor and forming a solid HEA feedstock by igniting the mixture to induce a self-propagating high-temperature synthesis reaction. The HEA feedstock is ground to form a powder suitable for use as a powder feedstock in an additive manufacturing device.

An example embodiment of a method is disclosed for making a component including an HEA. The method includes identifying a desired shape of the component and producing a shell or a mold having an interior volume corresponding to the desired shape of the component via at least one additive manufacturing process. A reaction component is added to the interior volume of the shell or the mold and combined with the powdered HEA precursor. The reaction component is configured to facilitate an SHA reaction with the powdered HEA precursor. The combined powdered HEA precursor and the SHS component are ignited in the shell or mold, thereby forming a stable HEA component approximating the desired shape of the component. The stable HEA component is removed from the shell or the mold.

DETAILED DESCRIPTION

Generally speaking, the disclosure combines Additive Manufacturing (AM) and Self-propagating high temperature synthesis (SHS), or its derivative processes for the production of HEAs in complex shapes. First, we create a cake using precursor HEA and SHS process. The cake can be ground and the resulting powder can be further spheroidized and used for printing 3D objects. Alternatively, thoroughly blended fine HEA powders can be placed inside a 3D printed capsule. The powder is then ignited and a combustion wave propagates through the blended powder fully consolidating the material.

Casting remains one of the most popular processes for developing HEA. Segregation of alloying elements is a well-known phenomenon that occurs in alloy castings. Most alloying elements have a lower solubility in the solid phase than in the liquid phase as is shown by phase diagrams. During a slow solidification process, the solutes are rejected into the liquid phase, leading to a continual enrichment of the liquid and lower solute concentrations in the primary solid. This problem is especially critical for HEA where the percentage of alloying elements is an order of magnitude higher compared to conventional cast alloys.

Increasing solidification rate is considered one of the main options to mitigate the risk of segregation and can be achieved through SHS. SHS provides a substantial advantage over casting for developing HEA because SHS offers much faster dynamics of solidification. The entire combustion synthesis takes seconds and involves generating heat by exothermal reaction, propagating combustion wave and solidification. As a result, the risk of segregation is significantly lower than during slow solidification processes of casting.

Figure 1:
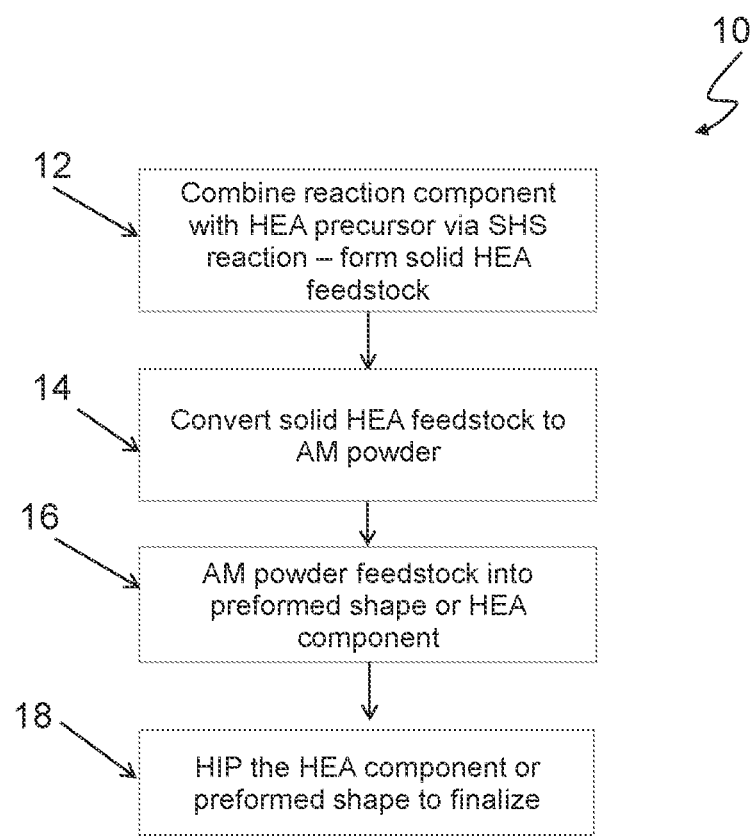
FIG. 1 is a first flow chart illustrating a first non-limiting example embodiment of a method for producing a high-entropy alloy component.

FIG. 1 shows example method 10, steps for making a component comprising a high entropy alloy (HEA). As noted above, high entropy alloys are an emerging class of materials. Due to their nature, it is difficult to identify promising candidate compositions which exhibit excellent physical properties often exceeding those of conventional alloys and even many superalloys. It is even more difficult, once formed, to process these materials into useful shapes as conventional mechanical processing techniques destabilize the delicate balance of the nanophases metastable grain boundaries, and atomic-level interactions that make the materials possible in the first place.

Method 10 includes step 12 of combining a reaction component with a powdered HEA precursor via a self-propagating high-temperature synthesis (SHS) reaction to form a solid HEA feedstock. Common examples of HEA precursors take many forms but, in most cases, involve a combination of 4 or more compatible metal elements that will eventually react to form a solid HEA feedstock. The HEA elements themselves may be reactive, but perhaps not enough to facilitate an SHS reaction, therefore, additional reaction component(s) can be added to facilitate the reaction of the elements in the powdered HEA precursor. Examples are based on the particular selection of HEA chemistry, but common reaction components can include nickel, aluminum, titanium, cobalt, chromium, iron, manganese, molybdenum, niobium, tantalum, tungsten, zirconium and vanadium, but many other combinations of elements can be considered, including refractory metals and ceramics.

The powdered HEA precursors and reaction component(s) can be combined in a vessel and ignited to induce an SHS reaction and thereby consolidate the material to form a solid HEA feedstock (step 12). Though it can be called a "cake" or "puck", the solid HEA feedstock can actually take any common form suitable for step 14, which is to convert the solid HEA feedstock into a powder suitable for use as a powder feedstock in an additive manufacturing device.

Processing the solid HEA feedstock in step 14 can include, but is not limited to grinding, rolling, and/or spheroidizing. In some embodiments, the solid HEA feedstock can be mechanically ground to produce an HEA powder, which can then be spheroidized via gas atomization to provide an HEA powder feedstock more suitable for additive manufacturing.

In some embodiments, an intermediate thermal processing and recrystallization step, as known in the art, can be applied to the HEA powder prior to spheroidization to provide a more uniform grain size.

Once in suitable form, step 16 includes additively manufacturing at least a portion of the powder feedstock into a stable HEA component or stable HEA preform having a shape approximating a desired shape of the component. As is known, AM processes can vary somewhat widely, particularly based on the composition of the powder and the parameters selected.

Some stable HEA components include at least a combination of niobium, molybdenum, tantalum, and tungsten. In certain embodiments, the stable HEA component further includes vanadium. In certain embodiments, each are present in approximately equivalent molar percentages. In certain embodiments, each element can be present in any molar percentage. Small variations up to +/−2 mol % for one or more elements, due to process tolerances and/or optimization of certain microstructures may occur.

Other example stable HEA components can include at least a combination of aluminum, titanium, zirconium, niobium, molybdenum, and tantalum. In certain embodiments, the aluminum, titanium, zirconium, niobium, each have a first molar percentage, and the molybdenum and tantalum each have a second molar percentage. Each first molar percentage is approximately equivalent, and each second molar percentage is approximately half of each of the first molar percentage. In other words, the molar percentages of molybdenum and tantalum add up to the first molar percentage.

Optionally, the stable HEA component only approximates the desired shape, porosity, or other properties and can only be subjected to limited post-processing that will not unduly disturb the delicate balance of atomic-level interactions. One allowable step is performing a hot isostatic processing (HIP) step 18 on at least the stable HEA component to finalize the stable HEA component into the desired shape. To facilitate one or more HIP steps 18, the stable HEA component can be placed in a mold which may itself be additively manufactured.

As noted, it has been extremely difficult and/or unreliable to produce complex shapes from HEA alloys as they are not amenable to conventional post-processing Sometimes the freeform approach described relative to FIG. 1 is not entirely suitable or reliable due to the desired component shape being sufficiently complex.

Figure 2:
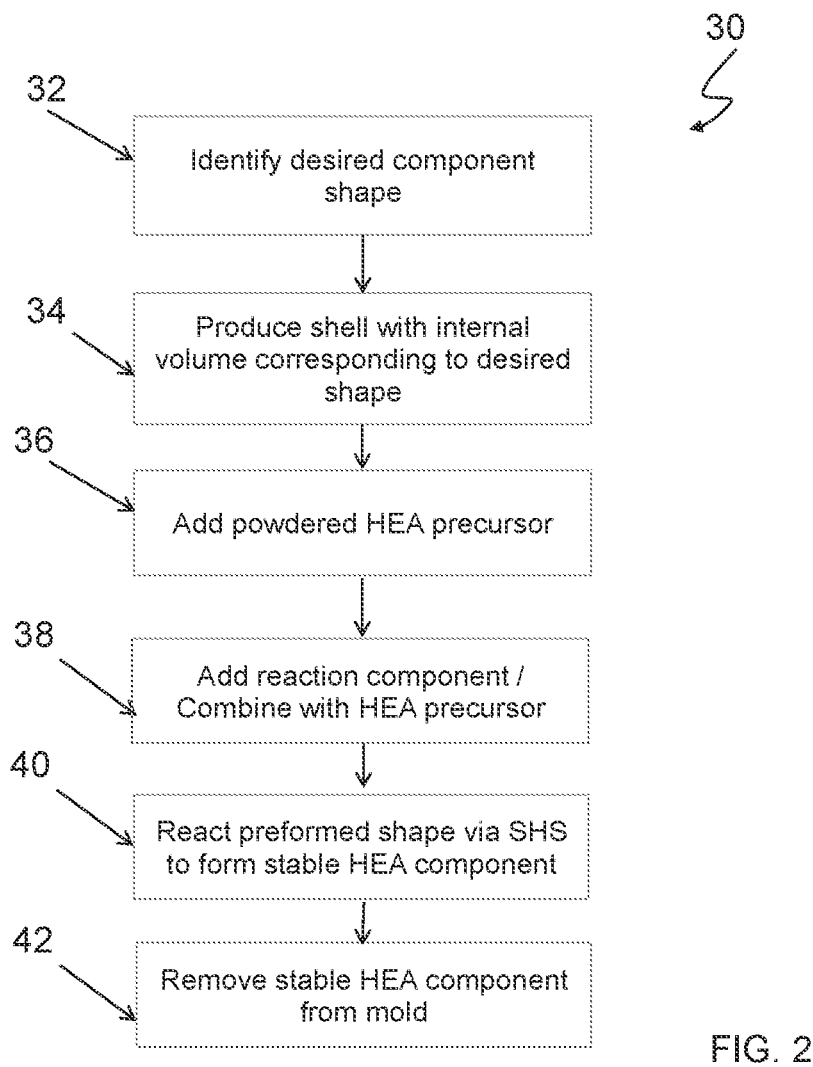
FIG. 2 is a second flow chart illustrating a second non-limiting example embodiment of the method for producing a high-entropy alloy component.

Thus, moving to FIG. 2, method 30 for making a component with a HEA includes step 32 of identifying a desired shape of the component. Step 34 then includes producing a shell or a mold having an interior volume corresponding to the desired shape of the component via at least one additive manufacturing process. This corresponding interior shape can be an approximation or a precise negative of the desired component shape.

For step 36, a powdered HEA precursor is added to the interior volume of the shell or the mold, and around an internal core if needed, before, during or after which, a reaction component is added with the powdered HEA precursor (step 38) to form a preformed shape. This reaction component is configured to facilitate a self-propagating high-temperature synthesis (SHS) reaction with the powdered HEA precursor of step 36. Examples of these materials are generally similar to those described relative to FIG. 1.

Once combined, step 40 includes reacting the combined powdered HEA precursor and the SHS component in the shell or mold, and internal core if needed, thereby forming a stable HEA component from the preformed shape. The mold or shell helps retain the contours of the preformed shape during and immediately after the reaction so that the stable HEA component at least approximates the desired shape of the component when complete, until it can be removed from the shell or the mold (step 42). Any residual shell or mold, or internal core if present, can be removed by any of a variety of processes including burn-out, acid or caustic leaching.

Similar to the freeform approach, method 30 can also include optionally performing a hot isostatic processing (HIP) step on at least the stable HEA component. The HIP step can be performed prior to and/or after the removing step.

The resulting stable HEA component can have similar or identical compositions to those described relative to example method 10/FIG. 1. In this case, however, the more ability to produce and maintain more complex shapes out of the shells and molds would make the process suitable for gas turbine or other very high temperature components. This is especially true as some HEA materials have been shown to have high temperature mechanical properties that can exceed those of superalloys currently in use. Thus, the ability to form more complex shapes is likely to allow for parts such as combustor liner or a turbine airfoil for a gas turbine engine to be reliably made with HEA materials.

Further, internal cooling of these and other parts can likely be incorporated, for example by forming an internal core around which the combined powdered HEA precursor and the SHS component are placed prior to the reacting step. After removing the core from the stable HEA component, it defines at least one internal cooling passage therein.

Discussion of Possible Embodiments

The following are non-exclusive descriptions of possible embodiments of the present disclosure.

A method for making a component comprising a high entropy alloy (HEA) includes combining a reaction component with a powdered HEA precursor, igniting the combination of the reaction component and the powdered HEA precursor to induce a self-propagating high-temperature synthesis (SHS) reaction and to form a solid HEA feedstock, converting the solid HEA feedstock into a powder HEA feedstock, and additively manufacturing at least a portion of the powder feedstock into a HEA component or HEA preformed shape approximating a desired shape of the component.

The method of the preceding paragraph can optionally include, additionally and/or alternatively, any one or more of the following features, configurations, additional components, and/or steps:

A further embodiment of the foregoing method, further comprising performing a hot isostatic processing (HIP) step on the HEA preformed shape to form the HEA component of the desired shape.

A further embodiment of the foregoing method, wherein the HIP step is performed in a mold.

A further embodiment of the foregoing method, wherein the mold is additively manufactured to match the desired shape.

A further embodiment of the foregoing method, wherein the HEA feedstock comprises niobium, molybdenum, tantalum, and tungsten each in up to equivalent molar percentages.

A further embodiment of the foregoing method, wherein the HEA feedstock further comprises vanadium also in up to equivalent molar percentages of niobium, molybdenum, tantalum, and tungsten.

A further embodiment of the foregoing method, wherein the HEA feedstock comprises nickel, cobalt, chromium, iron, aluminum, titanium, zirconium, niobium, molybdenum, and tantalum up to equivalent molar percentages.

A further embodiment of the foregoing method, wherein the aluminum, titanium, zirconium, niobium, each have a first molar percentage, and the molybdenum and tantalum each have a second molar percentage, wherein each first molar percentage is approximately equivalent, and wherein each second molar percentage is approximately half of each of the first molar percentage.

A further embodiment of the foregoing method, wherein converting the solid HEA feedstock into a powder HEA feedstock comprises grinding the HEA feedstock into a powder and spheroidizing the powder to produce the powder HEA feedstock.

An example embodiment of a method is disclosed for making a component including a high entropy alloy (HEA). The method includes combining a reaction component with a powdered HEA precursor to form a solid HEA feedstock. The solid HEA feedstock is converted into a powder suitable for use as a powder feedstock in an additive manufacturing device.

The method of the preceding paragraph can optionally include, additionally and/or alternatively, any one or more of the following features, configurations and/or additional components:

A further embodiment of the foregoing method, further comprising performing a hot isostatic processing (HIP) step on at least the stable HEA component to finalize the stable HEA component into the desired shape.

A further embodiment of any of the foregoing methods, wherein the HIP step is performed in a mold after the reacting step.

A further embodiment of any of the foregoing methods, wherein the mold is additively manufactured to match the desired shape.

A further embodiment of any of the foregoing methods, wherein the stable HEA component comprises niobium, molybdenum, tantalum, and tungsten each in up to equivalent molar percentages.

An example embodiment of a method is disclosed for making a component including a high entropy alloy (HEA). The method includes identifying a desired shape of the component and producing a shell or a mold having an interior volume corresponding to the desired shape of the component via at least one additive manufacturing process. A reaction component is added to the interior volume of the shell or the mold and combined with the powdered HEA precursor. The reaction component is configured to facilitate a self-propagating high-temperature synthesis (SHS) reaction with the powdered HEA precursor. The combined powdered HEA precursor and the SHS component are ignited in the shell or mold, thereby forming a stable HEA component approximating the desired shape of the component. The stable HEA component is removed from the shell or the mold.

The method of the preceding paragraph can optionally include, additionally and/or alternatively, any one or more of the following features, configurations, additional components, and/or steps:

A further embodiment of the foregoing method, further comprising performing a hot isostatic processing (HIP) step on at least the stable HEA component.

A further embodiment of any of the foregoing methods, wherein the HIP step is performed prior to the removing step.

A further embodiment of any of the foregoing methods, wherein the HIP step is performed after the removing step.

A further embodiment of any of the foregoing methods, wherein the stable HEA component comprises niobium, molybdenum, tantalum, and tungsten each in approximately equivalent molar percentages.

A further embodiment of any of the foregoing methods, wherein the stable HEA component further comprises vanadium also in an approximately equivalent molar percentage to the molar percentages of niobium, molybdenum, tantalum, and tungsten.

A further embodiment of any of the foregoing methods, wherein the stable HEA component comprises aluminum, titanium, zirconium, niobium, molybdenum, and tantalum.

A further embodiment of any of the foregoing methods, wherein the aluminum, titanium, zirconium, niobium, each have a first molar percentage, and the molybdenum and tantalum each have a second molar percentage, wherein each first molar percentage is approximately equivalent, and wherein each second molar percentage is approximately half of each of the first molar percentage.

A further embodiment of any of the foregoing methods, wherein the desired shape of the component includes a combustor liner or a turbine airfoil for a gas turbine engine.

A further embodiment of any of the foregoing methods, further comprising forming a core around which the combined powdered HEA precursor and the SHS component are placed prior to the reacting step.

A further embodiment of any of the foregoing methods, further comprising removing the core from the stable HEA component, thereby defining at least one internal passage therein.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for making a component comprising a high entropy alloy (HEA), the method comprising:
   combining a reaction component with a powdered HEA precursor;
   igniting the combination of the reaction component and the powdered HEA precursor to induce a self-propagating high-temperature synthesis (SHS) reaction and to form a solid HEA feedstock;
   converting the solid HEA feedstock into a powder HEA feedstock, wherein converting the solid HEA feedstock into a powder HEA feedstock comprises grinding the HEA feedstock into a powder; and
   additively manufacturing at least a portion of the powder feedstock into a HEA component or HEA preformed shape approximating a desired shape of the component;
   wherein the HEA feedstock comprises nickel, cobalt, chromium, iron, aluminum, titanium, zirconium, niobium, molybdenum, and tantalum, wherein the aluminum, titanium, zirconium, niobium, each have a first molar percentage, and the molybdenum and tantalum each have a second molar percentage, wherein each first molar percentage is approximately equivalent, and wherein each second molar percentage is approximately half of each of the first molar percentage.

2. The method of claim 1, wherein the at least portion of the powder feedstock is additively manufactured into a HEA preformed shape approximately a desired shape of the component and further comprising:
   performing a hot isostatic processing (HIP) step on the HEA preformed shape to form the HEA component of the desired shape.

3. The method of claim 2, wherein the HIP step is performed in a mold.

4. The method of claim 3, wherein the mold is additively manufactured to match the desired shape.

5. The method of claim 1, wherein converting the solid HEA feedstock into a powder HEA feedstock further comprises spheroidizing the powder to produce the powder HEA feedstock.

* * * * *